(12) United States Patent
Yamamoto et al.

(10) Patent No.: US 12,117,218 B2
(45) Date of Patent: Oct. 15, 2024

(54) AIR CONDITIONER

(71) Applicant: DAIKIN INDUSTRIES, LTD., Osaka (JP)

(72) Inventors: Masahiro Yamamoto, Osaka (JP); Kenji Koyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 348 days.

(21) Appl. No.: 17/442,322

(22) PCT Filed: Mar. 25, 2020

(86) PCT No.: PCT/JP2020/013442
§ 371 (c)(1),
(2) Date: Sep. 23, 2021

(87) PCT Pub. No.: WO2020/196661
PCT Pub. Date: Oct. 1, 2020

(65) Prior Publication Data
US 2022/0154987 A1    May 19, 2022

(30) Foreign Application Priority Data
Mar. 28, 2019    (JP) .................................. 2019-064677

(51) Int. Cl.
*F25B 49/02*    (2006.01)
*H02P 27/06*    (2006.01)

(52) U.S. Cl.
CPC .............. *F25B 49/02* (2013.01); *H02P 27/06* (2013.01)

(58) Field of Classification Search
CPC ....... F25B 49/02; H02M 7/003; H02M 1/123; H02M 7/5387; H02M 1/44; H02M 1/126; H02P 27/06; F24F 11/88
See application file for complete search history.

(56) References Cited

U.S. PATENT DOCUMENTS 5,720,179 A * 2/1998 Jung ...................... F24F 11/871
165/265
6,377,479 B1    4/2002 Ayano et al.
(Continued)

FOREIGN PATENT DOCUMENTS

CN    1750366 A    3/2006
CN    102057229 A    5/2011
(Continued)

OTHER PUBLICATIONS

International Search Report (PCT/ISA/210) issued in PCT/JP2020/013442, dated Jun. 30, 2020.
(Continued)

*Primary Examiner* — Frantz F Jules
*Assistant Examiner* — Martha Tadesse
(74) *Attorney, Agent, or Firm* — Birch, Stewart, Kolasch & Birch, LLP

(57) ABSTRACT

An air conditioner includes a first unit and a second unit. The first unit is connected to the second unit by a connection power wire and a connection ground wire, the connection power wire feeding power from the first unit to the second unit, the connection ground wire connecting ground of the first unit to ground of the second unit. The first unit includes a capacitor connected between the connection power wire and ground of the first unit. The connection power wire and the connection ground wire extend through a hole of a magnetic piece. The magnetic piece is configured such that when current flows through the connection power wire and the connection ground wire from one of the first unit and the second unit toward the other one of the first unit and the second unit, an orientation of a magnetic flux produced in the magnetic piece by the current that has flowed through the connection power wire is identical to an orientation of a
(Continued)

50: External Power Source magnetic flux produced in the magnetic piece by the current that has flowed through the connection ground wire.

5 Claims, 7 Drawing Sheets

(56) References Cited

U.S. PATENT DOCUMENTS

| | | | |
|---|---|---|---|
| 2011/0083467 | A1 | 4/2011 | Asano et al. |
| 2014/0345826 | A1* | 11/2014 | Kim .................. F24F 11/46 165/11.1 |
| 2016/0226560 | A1 | 8/2016 | Dent |
| 2016/0330876 | A1* | 11/2016 | Fujiwara .................. F24F 1/24 |
| 2023/0126973 | A1* | 4/2023 | In .................. F25B 47/022 62/129 |

FOREIGN PATENT DOCUMENTS

| | | |
|---|---|---|
| EP | 1 085 649 A2 | 3/2001 |
| EP | 1 724 534 A1 | 11/2008 |
| EP | 2 278 694 A1 | 1/2011 |
| EP | 2 293 329 A1 | 3/2011 |
| EP | 2 337 198 A2 | 6/2011 |
| EP | 2 693 623 A1 | 2/2014 |
| JP | 7-243691 A | 9/1995 |
| JP | 2001268890 A * | 9/2001 |
| JP | 2008-125248 A | 5/2008 |
| JP | 2009-30347 A | 12/2009 |
| JP | 2010-112585 A | 5/2010 |
| JP | 2011083080 A * | 4/2011 |
| JP | 2011-97668 A | 5/2011 |
| JP | 2011-101550 A | 5/2011 |
| JP | 2012-235633 A | 11/2012 |
| KR | 10-2009-0052167 A | 5/2009 |

OTHER PUBLICATIONS

International Preliminary Report on Patentability and English translation of the Written Opinion of the International Searching Authority for International Application No. PCT/JP2020/013442, dated Sep. 28, 2021.
Indian Office Action for Indian Application No. 202117046657, dated Mar. 23, 2022, with English translation.
Extended European Search Report for European Application No. 20778947.0, dated Nov. 9, 2022.
European Communication pursuant to Article 94(3) EPC for European Application No. 20 778 947.0, dated May 3, 2024.

* cited by examiner

Fig.2

AIR CONDITIONER

TECHNICAL FIELD

The present disclosure relates to an air conditioner.

BACKGROUND ART

In an air conditioner that connects one outdoor unit to one or more indoor units, the inverter circuit included in each unit serves as a generation source of noise current. The noise current in a low-frequency band is propagated through a power wire and a ground wire mainly as conducted noise. The noise current in a high-frequency band is propagated through space mainly as radiated noise with the power wire and the ground wire functioning as antennas. To suppress noise, each indoor and outdoor unit typically includes a noise filter that reduces conducted noise and a ferrite core that reduces radiated noise. Thus, the air conditioner that connects one outdoor unit to one or more indoor units needs multiple noise filters and multiple ferrite cores. Patent Document 1 discloses a configuration in which multiple ferrite cores are arranged in an electric unit to suppress noise.

PRIOR ART DOCUMENTS

Patent Documents

Patent Document 1: Japanese Laid-Open Patent Publication No. 2008-125248

SUMMARY OF THE INVENTION

Problems that the Invention is to Solve

FIG. 6 shows an air conditioner 100 that includes an outdoor unit 110 and an indoor unit 120. The outdoor unit 110 is connected to an external power source 150. The outdoor unit 110 feeds power to the indoor unit 120. In the air conditioner 100, noise current is generated through the switching of an inverter circuit 127 arranged in a control board 123 of the indoor unit 120. The noise current is propagated to a device 130 via a connection power wire 162 and a connection ground wire 172 as conducted noise. The device 130 is connected to a connection terminal. Normally, the indoor unit 120 includes a noise filter 124 in order to reduce conducted noise generated from the indoor unit 120. Further, the outdoor unit 110 includes a noise filter 114 in order to reduce conducted noise generated from the outdoor unit 110. However, the inventors of the present disclosure found that the noise filter 114 of the outdoor unit 110 can also be used as the noise filter that reduces the conducted noise generated from the indoor unit 120. The recirculation of the noise current generated from the indoor unit 120 through a noise path N1 reduces the noise propagated to the device 130, which is connected to the connection terminal 118. The noise path N1 includes a motor 122, a housing 121 of the indoor unit 120, the connection ground wire 172, a housing 111 of the outdoor unit 110, the noise filter 114, a first connection power wire 163, the connection power wire 162, and a second connection power wire 164. The use of the noise filter 114 of the outdoor unit 110 reduces the conducted noise generated from the indoor unit 120, thereby simplifying or omitting the noise filter 124 of the indoor unit 120.

FIG. 7 shows a configuration of the air conditioner 100 shown in FIG. 6. This configuration includes a magnetic piece 140 so as to suppress the radiated noise generated from the outdoor unit 110. Noise current is generated through the switching of an inverter circuit 117 arranged in a control board 113 of the outdoor unit 110. The flow of the noise current in a noise path E1 generates radiated noise with the connection power wire 162 functioning as an antenna. The noise path E1 includes a motor 112, the housing 111 of the outdoor unit 110, ground E, the connection power wire 162, and the first connection power wire 163. The arrangement of the magnetic piece 140 on the first connection power wire 163 in the noise path E1 reduces the noise current and radiated noise.

However, in the air conditioner 100 shown in FIG. 7, the inventors of the present disclosure found that the current in the noise path N1 (refer to FIG. 6) decreases and the current in a noise path N2 increases in the noise current generated through the switching of the inverter circuit 127. The noise path N2 includes the motor 122, the housing 121, the connection ground wire 172, a connection ground wire 132, the device 130, a connection power wire 131, and the second connection power wire 164. The inventors found that the current in the noise path N1 decreases and the current in the noise path N2 increases because the arrangement of the magnetic piece 140 on the first connection power wire 163 increases the resistance in the path of a portion of the magnetic piece 140 and reduces the noise current that flows through the noise filter 114 of the outdoor unit 110 so as to prevent the recirculation of the noise current.

It is an objective of the present disclosure to provide an air conditioner capable of reducing the influence of noise with a simple configuration based on the above-described findings.

Means for Solving the Problem

An air conditioner according to a first aspect includes a first unit and a second unit. The first unit is connected to the second unit by a connection power wire and a connection ground wire, the connection power wire feeding power from the first unit to the second unit, the connection ground wire connecting ground of the first unit to ground of the second unit. The first unit includes a capacitor connected between the connection power wire and ground of the first unit. The connection power wire and the connection ground wire extend through a hole of a magnetic piece. The magnetic piece is configured such that when current flows through the connection power wire and the connection ground wire from one of the first unit and the second unit toward the other one of the first unit and the second unit, an orientation of a magnetic flux produced in the magnetic piece by the current that has flowed through the connection power wire is identical to an orientation of a magnetic flux produced in the magnetic piece by the current that has flowed through the connection ground wire.

In this configuration, the magnetic piece reduces the radiated noise produced when the connection power wire from the first unit functions as an antenna. Further, the magnetic piece reduces the radiated noise produced when the connection ground wire from the first unit functions as an antenna. In contrast, the noise current from the second unit that flows through the connection power wire and the connection ground wire and recirculates between the first unit and the second unit flows through the connection power wire and the connection ground wire in opposite directions. Thus, the orientation of the magnetic flux produced in the magnetic piece by the current that has flowed through the connection power wire is opposite to the orientation of the magnetic flux produced in the magnetic piece by the current that has flowed through the connection ground wire. This causes the magnetic fluxes to cancel each other and thus maintains the recirculation of the noise current. Accordingly, the influence of noise is reduced with a simple configuration.

An air conditioner according to a second aspect further includes a third unit supplied with power from the first unit. The first unit further includes a connection terminal that connects the second unit and the third unit to the first unit. The magnetic piece is arranged between the connection terminal and the capacitor.

In this configuration, the flow of conducted noise from the second unit to the third unit is limited with a simple configuration.

In an air conditioner according to a third aspect, a refrigerant pipe in which refrigerant circulates between the first unit and the second unit is the connection ground wire.

In this configuration, the refrigerant pipe is used as the connection ground wire. Accordingly, the influence of noise is reduced with a simple configuration.

An air conditioner according to a fourth aspect includes a first unit and a second unit. The first unit includes a capacitor connected between a connection power wire and ground, a conductive housing connected to ground, and a conductive protrusion that protrudes from the housing. The first unit is connected to the second unit by a connection power wire and a connection ground wire, the connection power wire feeding power from the first unit to the second unit, the connection ground wire connecting ground of the first unit to ground of the second unit. The protrusion is connected to the connection ground wire. The connection power wire and the protrusion extend through a hole of a magnetic piece. The magnetic piece is configured such that when current flows through the connection power wire and the connection ground wire from one of the first unit and the second unit toward the other one of the first unit and the second unit, an orientation of a magnetic flux produced in the magnetic piece by the current that has flowed through the connection power wire is identical to an orientation of a magnetic flux produced in the magnetic piece by the current that has flowed through the connection ground wire.

In this configuration, the magnetic piece reduces the radiated noise produced when the connection power wire from the first unit functions as an antenna. Further, the magnetic piece reduces the radiated noise produced when the connection ground wire from the first unit functions as an antenna. In contrast, the noise current from the second unit that flows through the connection power wire and the connection ground wire and recirculates between the first unit and the second unit flows through the connection power wire and the protrusion in opposite directions. Thus, the orientation of the magnetic flux produced in the magnetic piece by the current that has flowed through the connection power wire is opposite to the orientation of the magnetic flux produced in the magnetic piece by the current that has flowed through the protrusion. This causes the magnetic fluxes to cancel each other and thus maintains the recirculation of the noise current. Accordingly, the influence of noise is reduced with a simple configuration.

BRIEF DESCRIPTION OF THE DRAWINGS

FIG. 2 is a circuit diagram schematically showing the configuration of the air conditioner of FIG. 1 including a third unit.

MODES FOR CARRYING OUT THE INVENTION

First Embodiment

Figure 1:
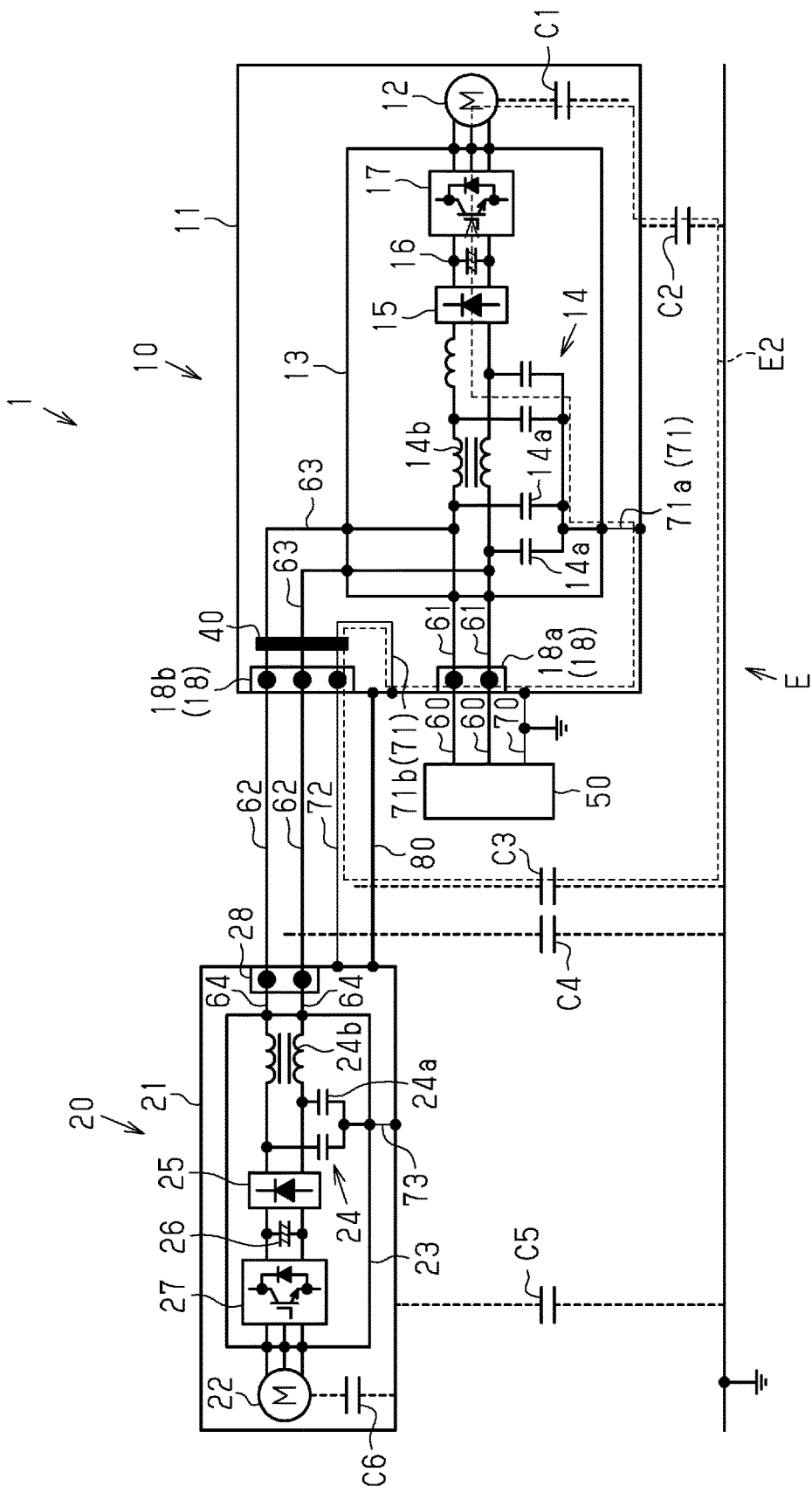
FIG. 1 is a circuit diagram schematically showing the configuration of an air conditioner according to a first embodiment.

An air conditioner 1 according to an embodiment will now be described with reference to FIGS. 1 and 2. The scope of the present disclosure is defined not by the detailed description but by the claims and their equivalents, and all variations within the scope of the claims and their equivalents are to be construed as being included in the disclosure.

The air conditioner 1 includes a first unit 10 and a second unit 20. The first unit 10 is connected to an external power source 50. The second unit 20 is supplied with power from the first unit 10. For example, the first unit 10 is an indoor unit arranged outdoors, and the second unit 20 is an indoor unit arranged indoors, such as in a space above the ceiling or to a wall surface. In the following description, the first unit 10 is used as an outdoor unit and the second unit 20 is used as an indoor unit. The external power source 50 is an alternating-current power source. The first unit 10 is connected to the external power source 50 by a power wire 60 and a ground wire 70. The ground wire 70 is connected to ground E. The first unit 10 is connected to the second unit 20 by a connection power wire 62, a connection ground wire 72, and a refrigerant pipe 80. The connection power wire 62 supplies the second unit 20 with power from the external power source 50. The connection ground wire 72 connects ground E of the first unit 10 to ground E of the second unit 20. The refrigerant pipe 80 is filled with refrigerant and causes refrigerant to circulate between the first unit 10 and the second unit 20. The refrigerant pipe 80 is made of a conductive material, such as copper.

The first unit 10 includes a housing 11. The housing 11 is made of a conductive material, such as sheet metal. The housing 11 includes a motor 12 and a control board 13 that supplies power to the motor 12. For example, the motor 12 drives at least one of a compressor and a fan. The control board 13 includes a noise filter 14 that reduces conducted noise, a rectifier circuit 15 that converts alternating-current power from the external power source 50 into direct-current power, a smoothing circuit 16 that eliminates alternating-current power, and an inverter circuit 17 that converts direct-current power into alternating-current power. The noise filter 14 reduces the current at a specified frequency. The noise filter 14 includes a capacitor 14a and a coil 14b. The housing 11 is connected to the control board 13 by a first ground wire 71a. The capacitor 14a is arranged on a connection wire that connects the connection power wire 62 to ground E.

The first unit 10 includes a connection terminal 18. The connection terminal 18 connects the power wires inside the housing 11 to the power wires outside the housing 11 and connects the ground wires inside the housing 11 to the ground wires outside the housing 11. The connection terminal 18 is, for example, a terminal base. The connection terminal 18 includes a first connection terminal 18a and a second connection terminal 18b. The first connection terminal 18a is arranged between the external power source 50 and the control board 13 of the first unit 10 to connect the power wire 60 to the inside of the housing 11. The second connection terminal 18b is arranged between the second connection terminal 18b and the control board 13 of the first unit 10 to connect the connection power wire 62 and the connection ground wire 72 to the inside of the housing 11. A first power wire 61 extends from the first connection terminal 18a into the housing 11 and is connected to the control board 13 and the motor 12. A first connection power wire 63 extends from the second connection terminal 18b into the housing 11 and is connected to the first power wire 61 on the control board 13. A first ground wire 71b extends from the second connection terminal 18b into the housing 11 and is connected to the housing 11.

The first unit 10 includes a magnetic piece 40 in the housing 11. The magnetic piece 40 includes a hole through which the first connection power wire 63 and the first ground wire 71b extend. The magnetic piece 40 is configured such that when current flows through the first connection power wire 63 and the first ground wire 71b from one of the first unit 10 and the second unit 20 toward the other one, the orientation of the magnetic flux produced in the magnetic piece 40 by the current that has flowed through the first connection power wire 63 is identical to the orientation of the magnetic flux produced in the magnetic piece 40 by the current that has flowed through the first ground wire 71b. The magnetic piece 40 is, for example, a ferrite core. The ferrite core includes one ferrite core or a combination of multiple ferrite cores. The first connection power wire 63 and the first ground wire 71b may simply extend through the hole of the magnetic piece 40 or may be wound around the magnetic piece 40 one or more times.

The first unit 10 further includes a first refrigerant device, a fan, and a controller. The first refrigerant device forms a refrigerant circuit (not shown). The first refrigerant device is connected to the refrigerant pipe 80. The first refrigerant device includes a compressor, a four-way switching valve, a heat exchanger, and a shut-off valve. The compressor draws refrigerant in, compresses the refrigerant, and then discharges the refrigerant. The compressor is, for example, a scroll-type or screw-type positive displacement compressor. The four-way switching valve, the heat exchanger, and the shut-off valve are arranged in a refrigerant pipe (not shown) in the first unit 10. The fan generates air flow that flows out of the first unit 10. The controller controls, for example, the switching of the inverter circuit 17. The controller includes a computing processor that executes a predetermined control program and includes a memory. The computing processor includes, for example, a central processing unit (CPU) or a micro-processing unit (MPU). The memory stores the information used for various control programs and various control processes. The memory includes, for example, a non-volatile memory and a volatile memory.

The second unit 20 includes a housing 21. The housing 21 is made of a conductive material, such as sheet metal. The housing 21 includes a motor 22 and a control board 23 that supplies power to the motor 22. For example, the motor 22 drives a fan. The control board 23 includes a noise filter 24 that reduces conducted noise, a rectifier circuit 25 that converts alternating-current power from the first unit 10 into direct-current power, a smoothing circuit 26 that eliminates alternating-current power, and an inverter circuit 27 that converts direct-current power into alternating-current power. The noise filter 24 reduces the current at a specified frequency. The noise filter 24 includes a capacitor 24a and a coil 24b. The housing 21 is connected to the control board 23 by a second ground wire 73.

The second unit 20 includes a connection terminal 28. The connection terminal 28 connects the power wires inside the housing 21 to the power wires outside the housing 21 and connects the ground wires inside the housing 21 to the ground wires outside the housing 21. The connection terminal 28 is, for example, a terminal base. The connection terminal 28 is arranged between the first unit 10 and the control board 23 of the second unit 20 to connect the connection power wire 62 to the inside of the housing 21. A second connection power wire 64 extends from the connection terminal 28 into the housing 21 and is connected to the control board 23 and the motor 22.

The second unit 20 further includes a second refrigerant device, a fan, and a controller. The second refrigerator forms a refrigerant circuit (not shown). The second refrigerant device is connected to the refrigerant pipe 80. The second refrigerant device includes a heat exchanger. The fan generates air flow that blows cold air or warm air out of the second unit 20. The controller controls, for example, the switching of the inverter circuit 27. The controller includes a computing processor that executes a predetermined control program and includes a memory.

The air conditioner 1 includes stray capacitances C1, C2, C3, C4, C5, and C6. The stray capacitance C1 is a stray capacitance of the motor 12 and the housing 11 of the first unit 10. The stray capacitance C2 is a stray capacitance of the housing 11 of the first unit 10 and ground E. The stray capacitance C3 is a stray capacitance of ground E and the connection ground wire 72. The stray capacitance C4 is a stray capacitance of ground E and the connection power wire 62. The stray capacitance C5 is a stray capacitance of the housing 21 of the second unit 20 and ground E. The stray capacitance C6 is a stray capacitance of the motor 22 and the housing 21 of the second unit 20.

Figure 2:
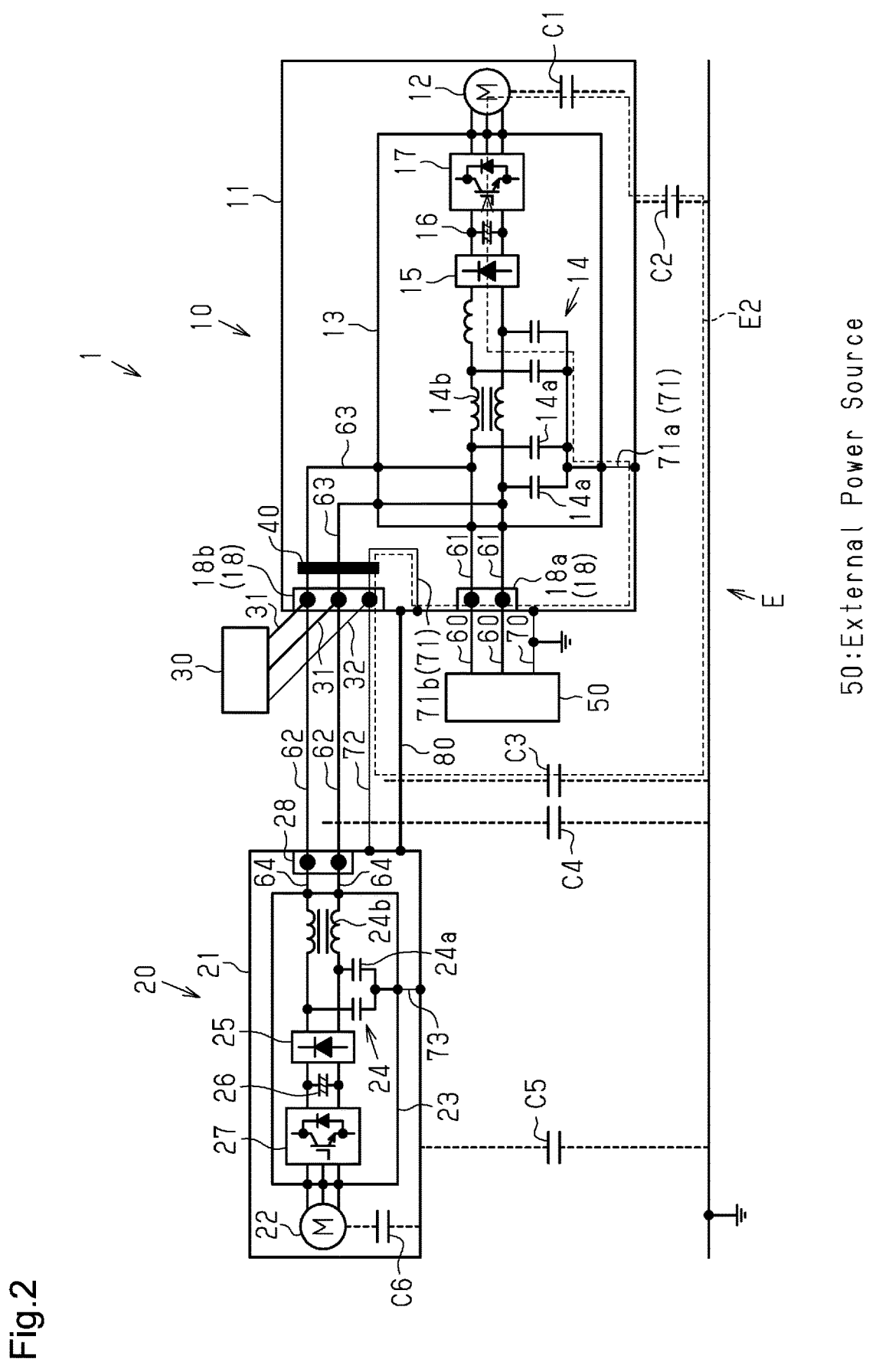

FIG. 2 shows the air conditioner 1 that further includes a third unit 30. The third unit 30 is supplied with power from the first unit 10. The third unit 30 has the same configuration as the second unit 20. The third unit 30 may be connected to the first unit 10 by the second connection terminal 18b or may be connected to the first unit 10 by a third connection terminal (not shown) that differs from the first connection terminal 18a and the second connection terminal 18b. When the third unit 30 is connected to the first unit 10 by the third terminal, the third connection terminal is connected to the second connection terminal 18b by a connection power wire (not shown) and a connection ground wire (not shown). In the illustrated example, the third unit and the second connection terminal 18b are connected to a connection power wire 31 and a connection ground wire 32.

The operation of the air conditioner 1 according to the first embodiment will now be described.

Figure 6:
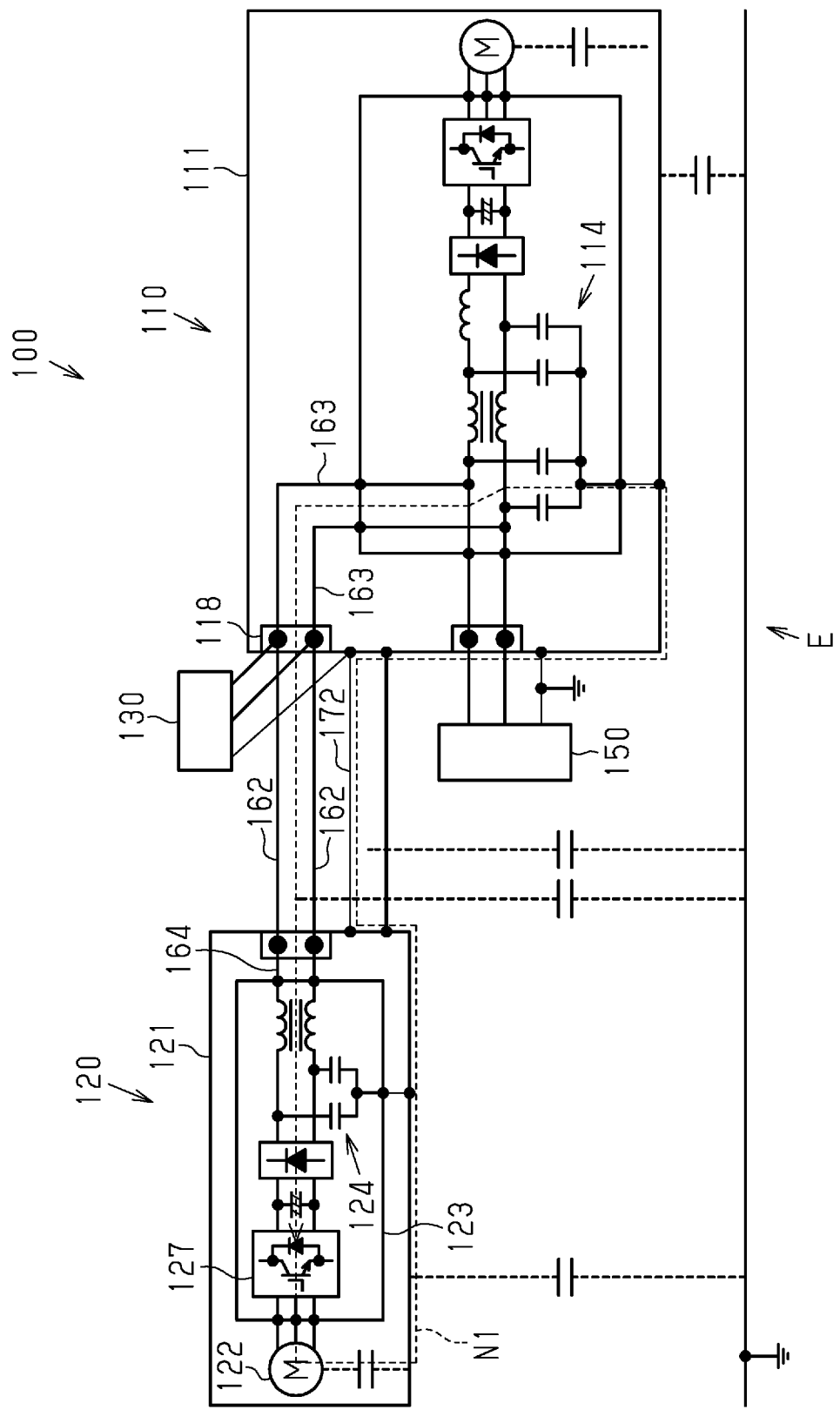
FIG. 6 is a circuit diagram showing an example of the arrangement of noise filters in an air conditioner.

When the air conditioner 1 starts running, the switching of the inverter circuit 27 of the control board 23 causes noise current to flow into the housing 21 via the stray capacitance C6 of the motor 22. Part of the noise current that has flowed into the housing 21 flows to the first unit 10 via the connection ground wire 72. The noise current that has flowed into the first unit 10 returns to the inverter circuit 27 of the control board 23 via the first ground wire 71b, the housing 11, the first ground wire 71a, the noise filter 14, the first connection power wire 63, and the connection power wire 62. Part of the noise current generated through the switching of the inverter circuit 27 of the control board 23 recirculates through the noise path N1, which is shown in FIG. 6. Thus, conducted noise is reduced by the noise filter 14 of the first unit 10. The reduced conducted noise has a noise terminal voltage at the second connection terminal 18b.

Figure 7:
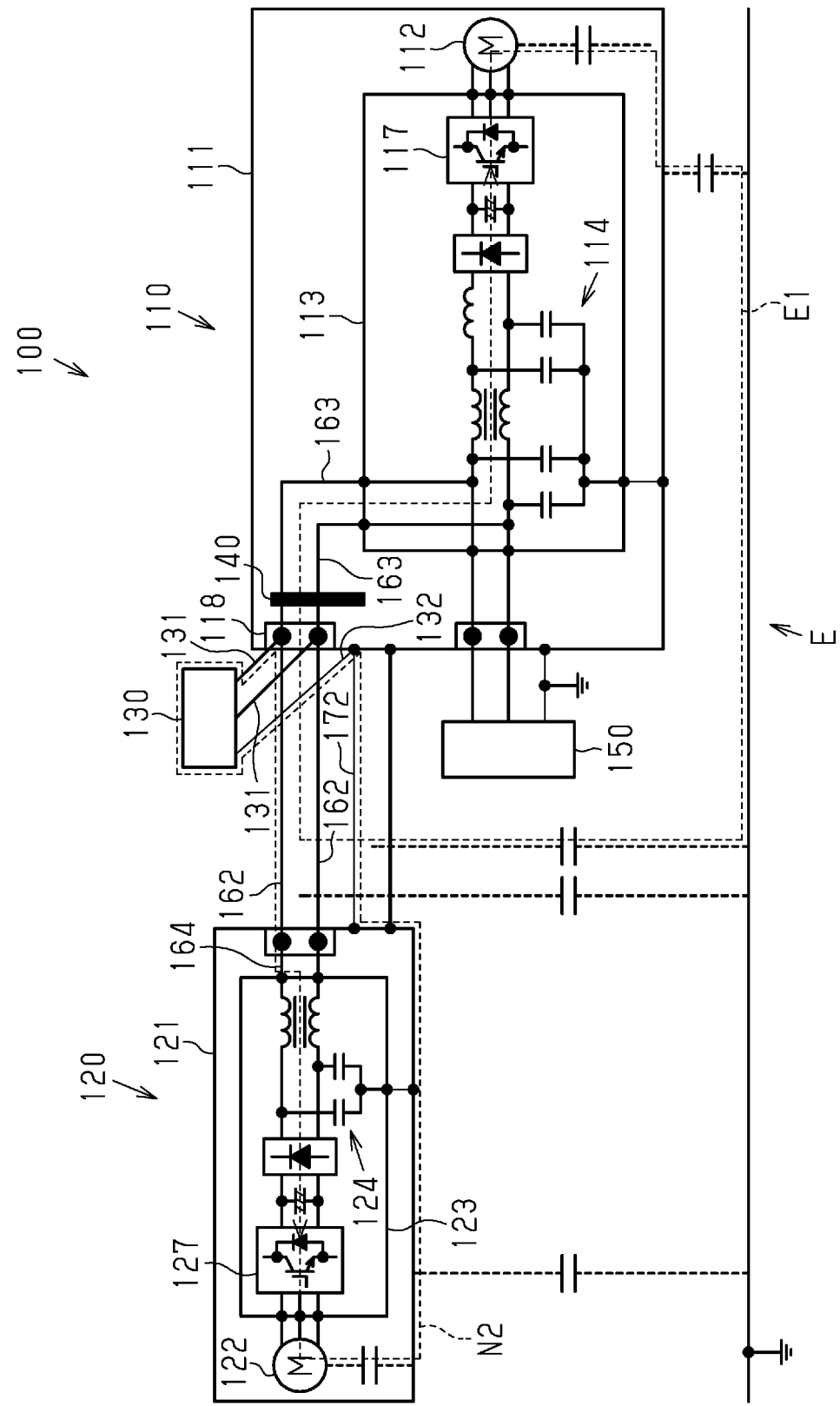
FIG. 7 is a circuit diagram showing an example of the arrangement of a magnetic piece in the air conditioner of FIG. 6.

When the air conditioner 1 starts running, the switching of the inverter circuit 17 of the control board 13 causes noise current to flow into the housing 11 via the stray capacitance C1 of the motor 12. Part of the noise current that has flowed into the housing 11 flows to ground E via the stray capacitance C2 and flows from ground E to the connection power wire 62 via the stray capacitance C4. The noise current flowing to the connection power wire 62 returns to the inverter circuit 17 of the control board 13 via the second connection terminal 18b and the first connection power wire 63. Part of the noise current generated through the switching of the inverter circuit 17 of the control board 13 passes through the noise path E1, which is shown in FIG. 7. Part of the noise current that has flowed into the housing 11 flows to ground E via the stray capacitance C2 and flows from ground E to the connection ground wire 72 via the stray capacitance C3. The noise current flowing to the connection ground wire 72 returns to the inverter circuit 17 of the control board 13 via the second connection terminal 18b, the first ground wire 71b, the housing 11, and the first ground wire 71a. Part of the noise current generated through the switching of the inverter circuit 17 of the control board 13 passes through a noise path E2. The noise path E2 includes the motor 12, the housing 11 of the first unit 10, ground E, the connection ground wire 72, the first ground wire 71b, the housing 11 of the first unit 10, and the first ground wire 71a. The noise currents flowing through the noise path E1 and the noise path E2 are reduced by the conversion of a magnetic field component into heat through magnetic loss of the magnetic piece 40 when the noise currents pass through the magnetic piece 40, which is arranged on the first connection power wire 63 and the first ground wire 71b.

The advantages of the air conditioner 1 according to the first embodiment will now be described.

The noise filter 14 of the first unit 10 reduces the conducted noise generated through the running of the second unit 20. This simplifies or omits the noise filter 24 of the second unit 20. Further, the magnetic piece 40 reduces the radiated noise generated through the running of the first unit 10 when the connection power wire 62 functions as an antenna and the connection ground wire 72 functions as an antenna. Thus, noise is suppressed with a simple configuration.

The first connection power wire 63 and the first ground wire 71b extend through the hole of the magnetic piece 40. Noise current from the second unit 20 that recirculates between the first unit 10 and the second unit 20 flows through the first connection power wire 63 and the first ground wire 71b in opposite orientations. The orientation of the magnetic flux produced in the magnetic piece 40 by the current that has flowed through the first connection power wire 63 is opposite to the orientation of the magnetic flux produced in the magnetic piece 40 by the current that has flowed through the first ground wire 71b. This causes the magnetic fluxes to cancel each other and thus maintains the recirculation of the noise current. Accordingly, the conducted noise generated through the running of the second unit 20 is reduced.

Second Embodiment

Figure 3:
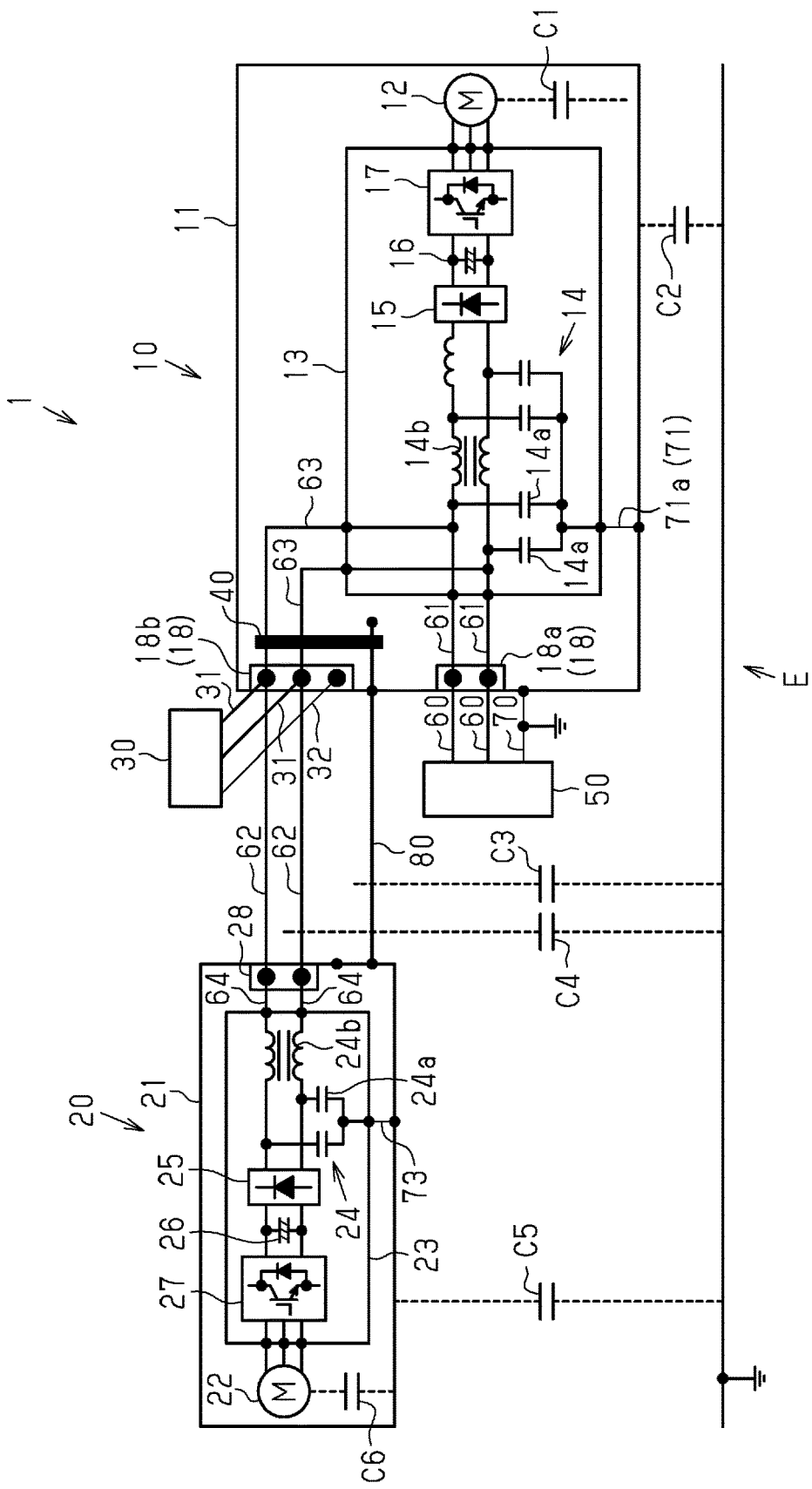
FIG. 3 is a circuit diagram schematically showing the configuration of an air conditioner according to a second embodiment.

The air conditioner 1 according to a second embodiment will now be described with reference to FIG. 3. The air conditioner 1 of the present embodiment differs from the air conditioner 1 of the first embodiment in that the refrigerant pipe 80, instead of the connection ground wire 72, extends through the hole of the magnetic piece 40. In the following description, to facilitate understanding, like or the same reference numerals are given to those components that have the same functions as the corresponding components of the air conditioner 1 according to the first embodiment. The functions will not be described.

Noise current generated through the switching of the inverter circuit 27 of the control board 23 flows to the first unit 10 via the refrigerant pipe 80. The refrigerant pipe 80 extends through the hole of the magnetic piece 40. The extended refrigerant pipe 80 is connected to the housing 11 by a conductive joint (not shown). The noise current returns to the inverter circuit 27 of the control board 23 via the housing 11, the first ground wire 71a, the noise filter 14, the first connection power wire 63, the connection power wire 62, and the second connection power wire 64. The noise filter 14 of the first unit 10 reduces the conducted noise generated from the inverter circuit 27.

The air conditioner 1 according to the second embodiment further provides the following advantage.

The refrigerant pipe 80 serves as a connection ground wire that connects ground E of the first unit 10 to ground E of the second unit 20. This omits the connection ground wire 72 and suppresses noise with a simpler configuration.

Third Embodiment

Figure 4:
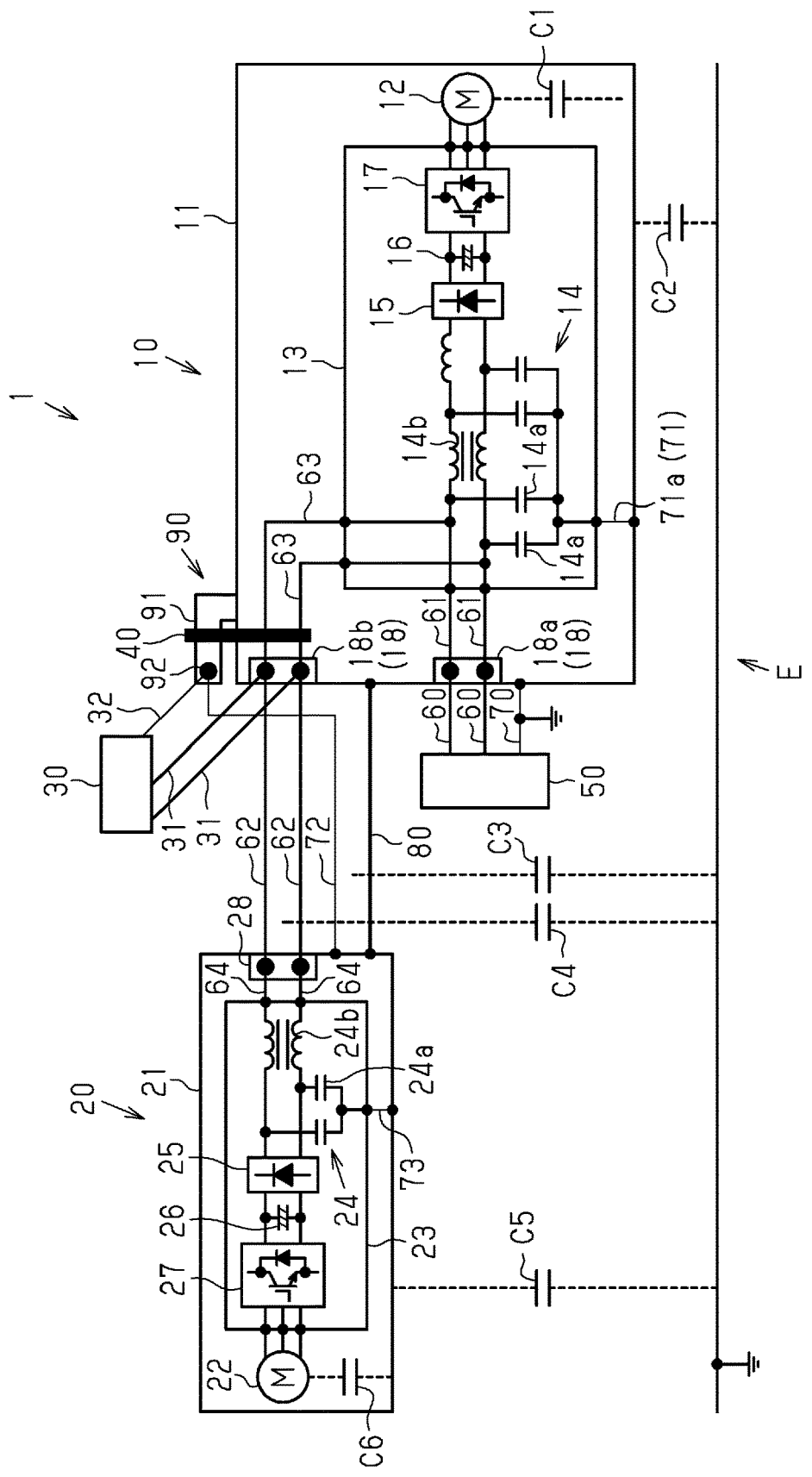
FIG. 4 is a circuit diagram schematically showing the configuration of an air conditioner according to a third embodiment.

The air conditioner 1 according to a third embodiment will now be described with reference to FIG. 4. The air conditioner 1 of the present embodiment differs from the air conditioner 1 of the first or second embodiment in that a protrusion 90 is arranged to connect the connection ground wire 72 to the first unit 10. In the following description, to facilitate understanding, like or the same reference numerals are given to those components that have the same functions as the corresponding components of the air conditioner 1 according to the first or second embodiment. The functions will not be described.

The first unit 10 includes the protrusion 90 that protrudes from the housing 11. The protrusion 90 includes a body 91 and a connection terminal 92. The body 91 is made of a conductive material. The body 91 is made of, for example, the same sheet metal as the housing 11. The connection terminal 92 connects the connection ground wire 72 to the body 91. The first connection power wire 63 and the body 91 extend through the hole of the magnetic piece 40.

Noise current generated through the switching of the inverter circuit 27 of the control board 23 flows to the body 91 via the connection ground wire 72. The noise current that has flowed to the body 91 returns to the inverter circuit 27 of the control board 23 via the housing 11, the first ground wire 71a, the noise filter 14, the first connection power wire 63, the connection power wire 62, and the second connection power wire 64. The noise filter 14 of the first unit 10 reduces the conducted noise generated from the inverter circuit 27.

Modifications

The above-described embodiments exemplify, without any intention to limit, an applicable form of an air conditioner related to the present invention. The air conditioner related to the present disclosure can take a form different from the forms illustrated in the embodiments. In one example, some of the components of the above-described embodiments may be replaced, changed, or omitted. Alternatively, another component may be added to the above-described embodiments. In the following modifications, the same reference characters are given to those elements that are the same as the corresponding elements of the above-described embodiments. Such elements will not be described.

Figure 5:
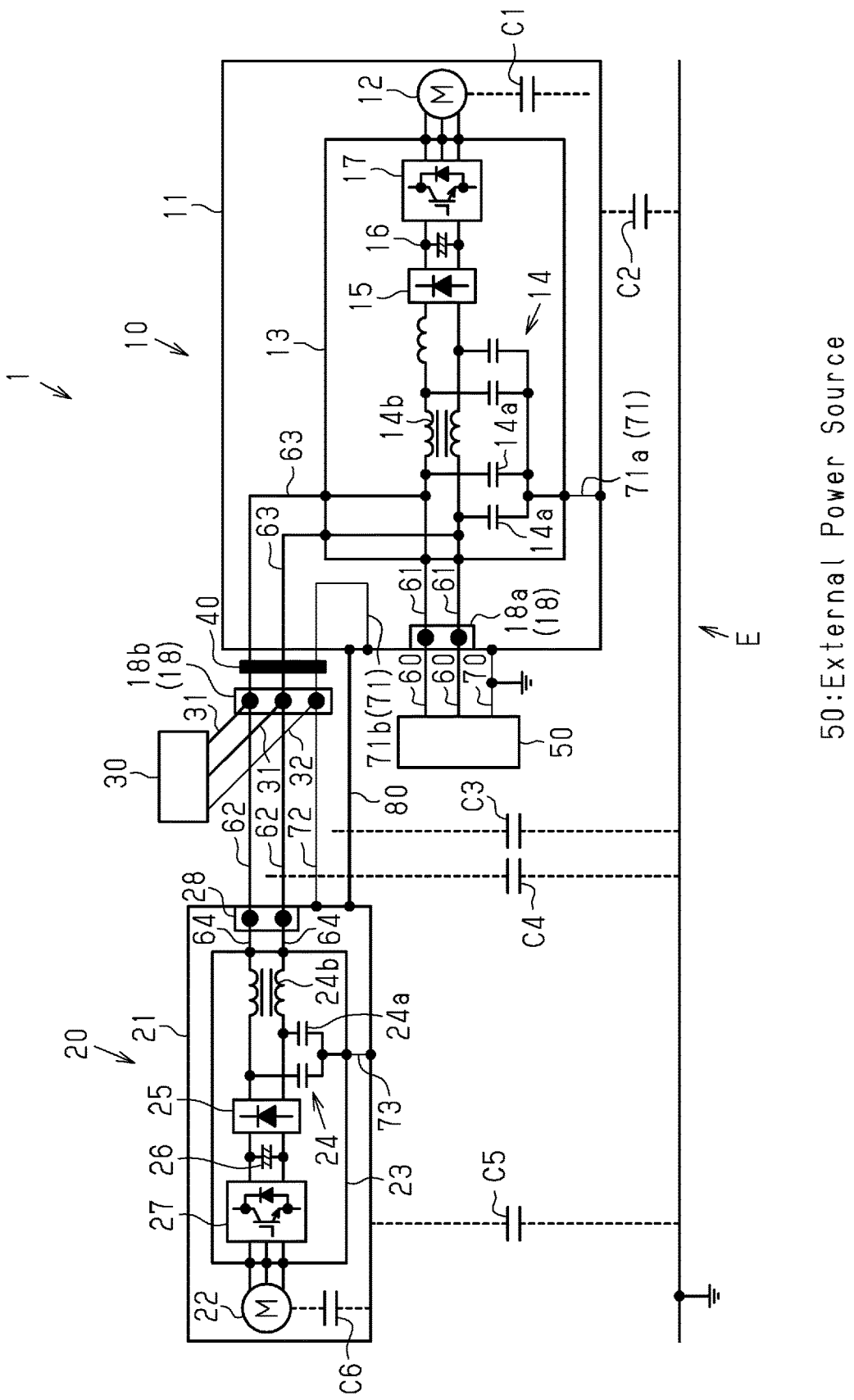
FIG. 5 is a circuit diagram schematically showing the configuration of an air conditioner according to a modification.

At least one of the first connection terminal 18a and the second connection terminal 18b may be arranged at a position separated from the housing 11 of the first unit 10. FIG. 5 shows a configuration in which the second connection terminal 18b is arranged between the housing 11 of the first unit 10 and the housing 21 of the second unit 20. The magnetic piece 40 is arranged on the connection power wire 62 and the connection ground wire 72 or on the first connection power wire 63 and the first ground wire 71b at a position closer to the housing 11 than to the second connection terminal 18b.

The second connection terminal 18b may be omitted in the air conditioner 1 according to the modification shown in FIG. 5.

In the first to third embodiments, the first unit 10 may be an indoor unit and the second unit 20 may be an outdoor unit.

The connection power wire 62, the connection ground wire 72, and the refrigerant pipe 80 may extend through the hole of the magnetic piece 40.

The housing 11 and the housing 21 may be made of a partially-conductive material. The material is, for example, sheet metal. The conductive part is connected to ground E.

While the embodiments of the present disclosure have been described herein above, it is to be appreciated that various changes in form and detail may be made without departing from the spirit and scope of the present disclosure described in the claims.

The invention claimed is:

1. An air conditioner, comprising a first unit and a second unit, wherein the first unit is connected to the second unit by a connection power wire and a connection ground wire, the connection power wire feeding power from the first unit to the second unit, the connection ground wire connecting ground of the first unit to ground of the second unit, the first unit includes a capacitor connected between the connection power wire and the ground of the first unit, the connection power wire and the connection ground wire extend through a hole of a magnetic piece, and the magnetic piece is configured such that when current flows through the connection power wire and the connection ground wire from one of the first unit and the second unit toward the other one of the first unit and the second unit, an orientation of a magnetic flux produced in the magnetic piece by the current that has flowed through the connection power wire is identical to an orientation of a magnetic flux produced in the magnetic piece by the current that has flowed through the connection ground wire, wherein the first unit and the second unit respectively include a rectifier circuit and an inverter circuit.

2. The air conditioner according to claim 1, further comprising a third unit supplied with power from the first unit, wherein
the first unit further includes a connection terminal that connects the second unit and the third unit to the first unit, and
the magnetic piece is arranged between the connection terminal and the capacitor.

3. The air conditioner according to claim 1, wherein a refrigerant pipe in which refrigerant circulates between the first unit and the second unit is the connection ground wire.

4. An air conditioner, comprising a first unit and a second unit, wherein
the first unit includes a capacitor connected between a connection power wire and ground, a conductive housing connected to ground, and a conductive protrusion that protrudes from the housing,
the first unit is connected to the second unit by the connection power wire and a connection ground wire, the connection power wire feeding power from the first unit to the second unit, the connection ground wire connecting ground of the first unit to ground of the second unit,
the protrusion is connected to the connection ground wire,
the connection power wire and the protrusion extend through a hole of a magnetic piece, and
the magnetic piece is configured such that when current flows through the connection power wire and the connection ground wire from one of the first unit and the second unit toward the other one of the first unit and the second unit, an orientation of a magnetic flux produced in the magnetic piece by the current that has flowed through the connection power wire is identical to an orientation of a magnetic flux produced in the magnetic piece by the current that has flowed through the connection ground wire,
wherein the first unit and the second unit respectively include a rectifier circuit and an inverter circuit.

5. The air conditioner according to claim 2, wherein a refrigerant pipe in which refrigerant circulates between the first unit and the second unit is the connection ground wire.

* * * * *